2,925,352
PLASTICISERS

William Geoffrey Lowe, Spondon, near Derby, England, assignor to British Celanese Limited, a company incorporated in Great Britain No Drawing. Application April 3, 1957
Serial No. 650,316

Claims priority, application Great Britain April 13, 1956

7 Claims. (Cl. 106—181)

This invention relates to plasticisers and to compositions containing plasticisers together with plasticisable film-forming polymers.

We have found that certain derivatives of malic acids provide a valuable series of new plasticisers for water-insoluble thermoplastic organic film-forming polymers, especially polymers of this kind which are organic substitution derivatives of cellulose or polymers of unsaturated esters of monocarboxylic acids. The malic acid derivatives in question are the neutral esters (i.e. those in which both carboxyl group are esterified) of saturated alcohols containing not more than 7 carbon atoms especially acyclic alcohols containing not more than 4 carbon atoms or cycloaliphatic alcohols containing not more than 7 carbon atoms. Examples of such alcohols are: methanol, ethanol, n-propanol, isopropanol, n-butanol, isobutanol, t-butanol, isopentanol, methoxyethanol, ethoxyethanol, cyclohexanol, and the monomethyl cyclohexanols.

The invention includes compositions containing the cellulose derivative or other polymer plasticised with the malic acid derivative as well as films, mouldings and other products made from or containing such compositions. In a preferred composition according to the invention the malic acid derivative is an ester of the formula

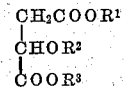

wherein $R^1$ and $R^3$ are saturated hydrocarbon radicals containing not more than 7 carbon atoms and $R^2$ is hydrogen, or a methyl, ethyl, acetyl, propionyl or benzoyl group.

In such a composition $R^1$ or $R^3$ may with advantage be identical paraffinic radicals containing not more than four carbon atoms, or cycloaliphatic radicals containing not more than seven carbon atoms (especially cyclohexyl or methyl cyclohexyl radicals) and R may with advantage be hydrogen, acetyl, propionyl or benzoyl.

The esters derived from alcohols containing not more than four carbon atoms and free from unbranched chains containing more than three carbon atoms have particularly good compatibility with cellulose acetates of low to medium acetyl value, i.e. of acetyl value (expressed as percentage of combined acetic acid) between 37 and 52 or between 52 and 54%. The di-isobutyl ester of dl-malic acid is especially valuable since in addition to good compatibility it is of relatively low water solubility (0.65% at 20° C. compared with 0.42% for dimethyl phthalate and 8.8% for triacetin), is liquid down to temperatures of about −65° C. and of low volatility (boiling range 156 to 161° C. at 12 mm.), is well retained by these cellulose acetates and in appropriate quantities imparts to them a valuable combination of physical properties as will be shown in more detail below. The di-isopropyl ester is of even higher compatibility with these cellulose esters but is more volatile (it boils at about 133° C. at 12 mm.) and of higher water solubility (4.3% at 20° C.). The di-isoamyl ester and the corresponding esters with unbranched chains have the advantages of lower volatility and lower water solubility, but show less compatibility for cellulose acetate, though they can all with advantage be used with the cellulose esters of higher fatty acids, e.g. cellulose propionate and cellulose butyrate.

A further series of plasticisers can be made by esterifying the alcoholic hydroxy group in malic acid (e.g. with acetic acid, propionic acid or benzoic acid) and esterifying the carboxyl groups as described above with an acyclic alcohol containing not more than four carbon atoms or cycloaliphatic alcohol containing not more than seven carbon atoms.

The following examples in which all the parts are by weight illustrate the invention.

Example 1

Di-isobutyl dl-malate was prepared by boiling a racemic mixture of d- and l-malic acid with excess of isobutanol, using p-toluene sulphonic acid as esterification catalyst, continuously distilling off isobutanol and the water liberated, separating the water from the azeotropic mixture with isobutanol and recycling the isobutanol.

Example 2

A film-forming dope of the following composition was made:

100 parts of cellulose acetate of film-forming grade and of acetyl value 52 to 54%, 30 parts of the di-isobutyl malate, and 300 parts of acetone.

From this composition a film of thickness 2 mils was cast by the evaporative method. This film had the following properties:

Ultimate tensile strength, kgs./cm.² _____ 520
Elongation at break, percent _____ 32
Schopper fold endurance, double folds _____ 167

Example 3

A film-forming dope was made, of composition differing from that of Example 2 in that the amount of plasticiser was 15 instead of 30 parts.

A film of 2 mils thickness was cast by the evaporative method from this dope and was found to have the following properties:

Ultimate tensile strength, kgs./cm.² _____ 808
Elongation at break, percent _____ 26
Schopper fold endurance, double folds _____ 108

Example 4

A film-forming dope of the following composition was prepared:

100 parts of cellulose acetate of acetyl value 38 to 39%, 12.5 parts of di-isobutyl dl-malate, 400 parts of dioxalane, and 27 parts of water. From this composition a film 2 mils in thickness was cast by the evaporative method and was then seasoned to a constant weight. The film was of good clarity, handle and mechanical properties and showed substantially no tendency to acquire an electric charge by friction.

Example 5

A moulding powder was made up of the following composition:

100 parts cellulose acetate of acetyl value 52 to 54%
30 parts of di-isobutyl dl-malate.

This powder was compression-moulded at 200° C. and gave mouldings of excellent quality.

Example 6

Di-isopropyl dl-malate was made by refluxing dehydrated isopropanol with a racemic mixture of d- and l-malic acid using p-toluene sulphonic acid as esterification catalyst in a reaction medium of benzene, and distilling off the water liberated in the form of an azeotropic mixture with the benzene.

Examples 7 to 11

The processes of these examples were carried out as in Examples 2 to 5 respectively but substituting di-isopropyl dl-malate for the di-isobutyl dl-malate of those examples.

Example 12

The di-isoamyl ester of dl-malic acid was made as in Example 6 but employing isopentanol instead of isopropanol. This was found to be a useful plasticiser for cellulose propionate and cellulose acetate butyrate.

Example 13

A film-forming dope was made and cast into films as described in Example 3 but using, instead of di-isobutyl malate, diethyl acetoxy dl-malate made by reacting on diethyl dl-malate with acetic anhydride in the presence of pyridine at a temperature below 20° C.

Example 14

An adhesive suitable for bonding together cellulosic layers was formulated as follows:

100 parts of polyvinyl acetate
15 parts of di-isobutyl dl-malate
400 parts of acetone The examples show the making and use of plasticisms which are derivatives of dl-matic acid. In the same way, corresponding derivatives of d-malic acid or l-malic acid alone may be made and used.

The plasticisers described above are monomeric. The invention, however, includes the making, and use in plasticising plasticisable film-forming polymers, of polymeric plasticisers by polycondensation of malic acid or an acylmalic acid with a dihydric alcohol, e.g. ethylene glycol, 1,3-propylene glycol, 1,2-propylene glycol or the butane diols. To serve as plasticisers the polycondensates must not be of high average degree of polymerisation. This may, for instance, be less than 10, e.g. from 3 to 5 or 8. The use of an unsymmetrical glycol is of advantage in keeping down the melting-point of the polycondensate as is also the use of two or more glycols in admixture. These expedients are of particular advantage when the degree of polymerisation is substantially higher than 10, e.g. 50 to 100 or 200 or more.

An important application of compositions comprising cellulose acetate or like ester of cellulose plasticised by means of the plasticisers of the invention is in the manufacture of films, especially thin film for wrapping purposes. Wrapping film of the composition referred to is particularly suitable for wrapping perishable foodstuffs, e.g. green vegetables, meat, fats and cheese. Thin film of the kind referred to is conveniently made by dissolving the cellulose ester and plasticiser in a volatile solvent, casting the solution on to a travelling film-forming surface, e.g. that of a band or drum, and evaporating the solvent. Thicker films and sheets can be made, for instance, by the block process in which cellulose derivative and plasticiser are dissolved in a volatile solvent most of which is removed in a malaxating operation on hot rolls, after which the composition is sheeted, the sheets are stacked and pressed while hot into a block, from which sheets of the desired thickness are sliced after which they are seasoned to remove residual solvent.

Compositions comprising the cellulose derivative and plasticiser may be used in moulding (including injection moulding) and hot extrusion. In addition to the plasticisers of the invention, other plasticisers for the cellulose derivative may be included in the composition. For cellulose acetate such plasticisers include: dimethyl phthalate, diethyl phthalate, dibutyl phthalate, dimethoxyethyl phthalate, triacetin, methylphthalyl ethyl glycolate, ethylphthalyl ethyl glycolate, dibutyl tartrate, triethyl citrate and acetyl triethyl citrate.

The invention is of particular utility in plasticising cellulose acetate. As indicated above, however, the plasticisers of the invention may also be employed in plasticising other organic substitution derivatives of cellulose, especially cellulose esters of paraffinic monocarboxylic acids containing 2 to 4 carbon atoms, e.g. cellulose propionate, cellulose butyrate, cellulose acetate propionate and cellulose acetate butyrate, and the plasticisers of the invention can also be employed in plasticising synthetic polymers of unsaturated esters of monocarboxylic acids, e.g. polyvinyl acetate, polymethyl methacrylate, polyethyl acrylate, and the acetone-soluble copolymers of vinyl acetate, e.g. with vinyl chloride, and with other unsaturated esters, including vinyl propionate, isopropenyl acetate and the esters of acrylic, methacrylic, maleic, fumaric, crotonic, itaconic, and citraconic acids.

Having described my invention, what I desire to secure by Letters Patent is:

1. A composition of which the major portion is a cellulose acetate containing 37–54% of combined acetic acid, said composition containing as plasticizer for the polymer and in amount sufficient to plasticize said composition, an ester of the formula:

$$\begin{array}{c} CH_2COOR \\ | \\ CHOH \\ | \\ COOR \end{array}$$

where R is an isoalkyl group of the class consisting of isopropyl, isobutyl and isoamyl groups.

2. A composition according to claim 1, wherein the cellulose acetate contains 38–39% of combined acetic acid and the plasticizer consists of di-isobutyl dl-malate.

3. A composition according to claim 1, wherein the cellulose acetate contains 52–54% of combined acetic acid and the plasticizer consists of di-isobutyl dl-malate.

4. A composition according to claim 1, wherein the cellulose acetate contains 52–54% of combined acetic acid and the plasticizer consists of di-isopropyl dl-malate.

5. A composition according to claim 1, wherein the cellulose acetate contains 52–54% of combined acetic acid and the plasticizer consists of di-isoamyl dl-malate.

6. A food wrapping foil composed of a composition claimed in claim 2, wherein the cellulose acetate contains 52–54% of combined acetic acid.

7. A food wrapping foil comprising cellulose acetate containing 52–54% of combined acetic acid and, as plasticizer therefor and in amount sufficient to plasticize said cellulose acetate, di-isobutyl dl-malate.

References Cited in the file of this patent

UNITED STATES PATENTS

| 1,848,155 | Boehmer | Mar. 8, 1932 |
| 2,372,643 | Almy | Apr. 3, 1945 |

FOREIGN PATENTS

| 428,160 | Great Britain | May 8, 1935 |